United States Patent
Delio, Jr.

(10) Patent No.: US 12,340,188 B1
(45) Date of Patent: Jun. 24, 2025

(54) ZERO MODIFICATION EXPORT HOOKING

(71) Applicant: Riverbed Technology LLC, Redwood City, CA (US)

(72) Inventor: John J. Delio, Jr., Manchester, NH (US)

(73) Assignee: RIVERBED TECHNOLOGY LLC, Redwood City, CA (US)

( * ) Notice: Subject to any disclaimer, the term of this patent is extended or adjusted under 35 U.S.C. 154(b) by 145 days.

(21) Appl. No.: 18/059,342

(22) Filed: Nov. 28, 2022

Related U.S. Application Data

(60) Provisional application No. 63/284,573, filed on Nov. 30, 2021.

(51) Int. Cl.
   *G06F 8/36* (2018.01)

(52) U.S. Cl.
   CPC ...................... *G06F 8/36* (2013.01)

(58) Field of Classification Search
   None
   See application file for complete search history.

(56) References Cited

U.S. PATENT DOCUMENTS

| | | | | |
|---|---|---|---|---|
| 7,162,711 B2 * | 1/2007 | Czjkowski | ........ | G06F 9/44563 717/114 |
| 8,910,148 B2 * | 12/2014 | Bowyer | ........ | G06F 8/61 717/174 |
| 9,898,615 B1 * | 2/2018 | Evans | ........ | G06F 21/53 |
| 2005/0108721 A1 * | 5/2005 | Oshima | ........ | G06F 21/52 714/E11.204 |
| 2006/0080390 A1 * | 4/2006 | Ung | ........ | H04L 69/08 709/204 |
| 2007/0240171 A1 * | 10/2007 | Biro | ........ | G06F 9/541 714/E11.207 |
| 2014/0282431 A1 * | 9/2014 | Delio, Jr. | ........ | G06F 11/3093 717/130 |
| 2016/0205130 A1 * | 7/2016 | Teller | ........ | H04L 63/1441 726/22 |
| 2022/0094760 A1 * | 3/2022 | Jang | ........ | G06F 8/63 |

OTHER PUBLICATIONS

Berdajs et al., "Extending applications using an advanced approach to DLL injection and API hooking," Wiley & Sons, 2010, 18pg. (Year: 2010).*

Lopez et al., "A Survey on Function and System Call Hooking Approaches," Springer, 2017, 23pg. (Year: 2017).*

Wang et al., "Lprov: Practical Library-aware Provenance Tracing," ACM, 2018, 13pg. (Year: 2018).*

* cited by examiner

*Primary Examiner* — Ryan D. Coyer
(74) *Attorney, Agent, or Firm* — Park, Vaughan, Fleming & Dowler LLP; Laxman Sahasrabuddhe

(57) ABSTRACT

A first request may be received from a loader to create a first file handle corresponding to a first library, where the first request may include a first identifier corresponding to the first library, and where the loader may be part of an operating system of a computer system. It may be determined that the first library is to be proxied by a second library. The first identifier in the first request may be replaced with a second identifier corresponding to the second library. The first file handle may be created based on the first request. The first file handle may be provided to the loader. An export section of a first image corresponding to the first file handle may be customized when the first image is mapped into a memory.

18 Claims, 5 Drawing Sheets

ZERO MODIFICATION EXPORT HOOKING

RELATED APPLICATION

This application claims priority to U.S. Provisional Patent Application No. 63/284,573, filed on 30 Nov. 2021, the contents of which are herein incorporated by reference in their entirety for all purposes.

TECHNICAL FIELD

This disclosure generally relates to computer networks and computer systems. More specifically, this disclosure relates to zero modification export hooking.

BACKGROUND

A computing infrastructure or infrastructure may refer to a collection of computers and networks used by an organization. Numerous objects (which may include, but are not limited to, users, devices, applications, and networks) may be monitored and performance data may be collected for each monitored object. Software code executing in a computing infrastructure may be desired to be modified for many reasons, which may include, but are not limited to, monitoring and collecting performance data.

SUMMARY

A first request may be received from a loader to create a first file handle corresponding to a first library, where the first request may include a first identifier corresponding to the first library, and where the loader may be part of an operating system of a computer system. It may be determined whether the first library is to be proxied by a second library. Specifically, determining whether the first library is to be proxied by the second library may include determining if the first identifier is in a set of identifiers corresponding to libraries that are desired to be proxied. Responsive to determining that the first library is to be proxied by the second library, the first identifier in the first request may be replaced with a second identifier corresponding to the second library. The first file handle may be created based on the first request. The first file handle may be provided to the loader. Specifically, providing the first file handle to the loader may include replacing the second identifier with the first identifier in a first response corresponding to the first request.

It may be detected that first image corresponding to the first file handle is mapped into a memory of the computer system. An export section of the first image may be customized based on a first set of export symbols in the first library and a second set of export symbols in the second library.

In some embodiments described herein, customizing the export section of the first image may include determining an export symbol that is in the first set of export symbols but is not in the second set of export symbols, and adding a forwarding reference into the export section of the first image, where the forwarding reference corresponds to the export symbol in the second library. In some embodiments described herein, the first set of export symbols may be cached while determining whether the first library is to be proxied by the second library.

In some embodiments described herein, a second request may be received from the loader to create a second file handle, where the second request includes a third identifier.

It may be determined whether the third identifier in the second request is desired to be replaced with the first identifier. Specifically, determining whether the third identifier in the second request is desired to be replaced with the first identifier may include determining if the third identifier is in a set of identifiers that are desired to be replaced. Responsive to determining that the third identifier in the second request is desired to be replaced with the first identifier, the third identifier in the second request may be replaced with the first identifier. The second file handle may be created based on the second request. The second file handle may be provided to the loader. Specifically, providing the second file handle to the loader may include creating a second response corresponding to the second request, where the second response includes the second file handle and the third identifier, and providing the second response to the loader.

In some embodiments described herein, the first identifier may be a first file system path corresponding to the first library, the second identifier may be a second file system path corresponding to the second library, and the third identifier may be a third file system path. In some embodiments described herein, the third file system path may be an invalid path.

DETAILED DESCRIPTION

Figure 1:
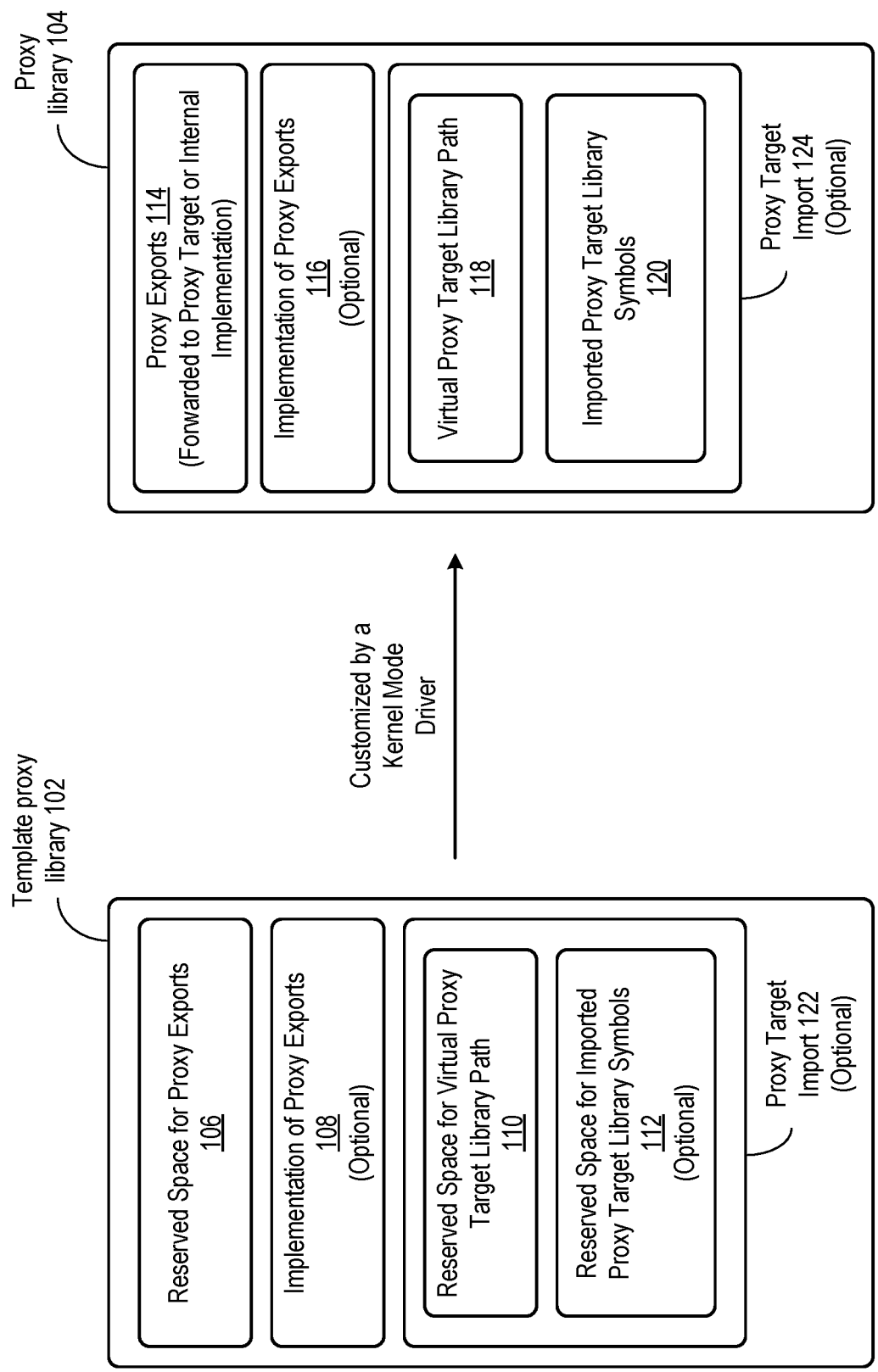
FIG. 1 illustrates tailoring a template proxy library to create a proxy library in accordance with some embodiments described herein.

A computer system may generally refer to an apparatus that includes circuitry (e.g., one or more processors) and software (e.g., a set of processor instructions) which runs on the circuitry and causes the apparatus to perform desired tasks. An operating system may refer to software that manages computational resources (which may include, but are not limited to, memory, file system, and user interface devices) of a computer system.

The term "application" may refer to a software program, which is distinct from the operating system, and which carries out a desired task. The term "library" may refer to a collection of software programs and/or data that may be used by one or more applications. A library may be shared by multiple applications on a computer system. The term "loader" may refer to part of the operating system which prepares an application for execution. When an application is desired to be executed on a computer system, the loader may load one or more libraries which are used by the application.

A first library L1 may be proxied by a second library L2 for many reasons, which may include, but are not limited to, instrumentation (e.g., for collecting performance data) or providing an alternate implementation of the first library. When a library L1 is proxied by library L2, at least some requests (which may include, but are not limited to, function calls and data structure accesses) intended for library L1 are performed, serviced, and/or forwarded by library L2. When library L2 forwards a request to L1, the request is performed and/or serviced by code or data in L1. In this disclosure, the term "proxy target library" may refer to a library (e.g., library L1) that is intended to be proxied. The term "template proxy library" may refer to a proxy library prior to performing dynamic tailoring or customization. The term "dynamically tailoring" may refer to customization that occurs during runtime (as opposed to compile time). Once the template proxy library has been dynamically tailored to the intended proxy target library, the template proxy library may thereafter be referred to as the "proxy library" (e.g., library L2).

In some approaches, a proxy target library file may be replaced within the file system with a proxy library of the same name as the original target library. One drawback with this solution is that the original proxy target file is lost due to the overwrite. In this case, the proxy library may not be able to call the original proxy target if needed and the application's deployment has been modified. Problems can also arise if the application is repaired, in which case the original files may be returned and the proxy library may be potentially lost, thus breaking the proxy solution.

In some approaches, the proxy target library may be renamed, and a proxy library may be created with the original proxy target name. This approach prevents the loss of the original proxy target, which means that the proxy library could still load and call the renamed proxy target library. However, this also breaks the deployment and once again the application can be repaired, thus breaking the proxy solution. There is also the chance that the application can appear corrupted if the application or third-party software checks the application's files within the file system.

In some approaches, the proxy target file may be modified before its use. Technically, this is not a proxy solution, but it would be possible to modify the proxy target library such that one could provide an alternative implementation of exported functions. This solution has the drawback of modifying the proxy library file, which may break the digital signature of the file and can be flagged as an issue by anti-virus software. Additionally, the modified file may be reverted to the original version during a repair operation which may cause the modified file to be lost.

Embodiments described herein may provide a method and an apparatus for injecting a dynamically tailored proxy library into a running process, instead of or immediately preceding the load of a proxy target library, with the intention of acting as a proxy for the target library. Specifically, embodiments described herein may proxy target libraries without modifying the target libraries. Specifically, the proxy library can hook or extend the proxy target library's exported functions without modifying the proxy target library or the host application's deployment. In some embodiments, a template proxy library and a kernel mode file system filter driver may work in concert to proxy the exports of a proxy target library, such that the proxy library may monitor, replace, or provide additional functionality for the proxy target library. The term "kernel mode" (as opposed to "user mode") may refer to a mode of execution in which the executing program (e.g., a driver) has direct and unrestricted access to the computational resources of the computer system. Thus, a "kernel mode driver" may be a driver which has direct and unrestricted access to the computational resources of the computer system.

Technical advantages of embodiments described herein include, but are not limited to, (1) providing the functionality of the proxy library by hooking exported functions dynamically and without changing the deployment of an application, and (2) enabling the application that uses the proxy target library to continue to work even if new versions of the proxy target library are released. Since embodiments described herein dynamically customize the template proxy library at runtime to match the proxy target library, the embodiments can add the current set of exports needed to match a new version of the proxy target library. Further, since a template proxy library is dynamically tailored at runtime, a single template proxy library can be used to proxy multiple proxy target libraries.

The template proxy library may be injected when the OS is attempting to load a proxy target library. During the load of the template proxy library, the template proxy library may be dynamically tailored to match the proxy target library for the purpose of acting as a proxy for the target library and therefore can hook any exported functions provided by the target library. Embodiments described herein can work within Windows Control Flow Guard and Isolated User Mode environments.

Template Proxy Library

The template proxy library may be a base library that can be optionally customized at runtime by a kernel mode driver to create a proxy library. If the template proxy library contains all the necessary pieces required to form a proxy library, then no tailoring or customization needs to be performed by the kernel mode driver and the template proxy library can be used, as is, as a proxy library. If the template proxy library does not specify all required proxy library data, the template proxy library can be customized by the kernel mode driver at runtime. How much of the proxy library data is included within the template proxy library or is customized at runtime by the kernel mode driver is dependent on the implementation. What is required within a proxy library based on the goal of the proxy library may also be implementation dependent. For example, if a proxy library wants to provide an alternate implementation of a proxied routine, the proxy library would need to include some implementation code. Other optional components within the template proxy library may also exist.

FIG. 1 illustrates tailoring a template proxy library to create a proxy library in accordance with some embodiments described herein.

Template proxy library 102 may include a reserved space for proxy exports 106, implementation of proxy exports 108 (which may be optional), and proxy target import 122 (which may be optional). Proxy target import 122 may include a reserved space for virtual proxy target library path 110, and a reserved space for imported proxy target library symbols 112 (which may be optional). Template proxy library 102 may be customized by a kernel mode driver to create proxy library 104, which may include proxy exports 114, where each proxy export may be forwarded to the proxy target library or to an internal implementation. Proxy library 104 may optionally include implementation of proxy exports 116, and proxy target import 124. Proxy target import 124 may include virtual proxy target library path 118 and optionally include imported proxy target library symbols 120.

Proxy Target Export Symbols

A proxy library (e.g., proxy library 104) may include an exported symbols section (e.g., proxy exports 114) which may include the exported symbols contained within the proxy target library, i.e., the exported symbols of the proxy library may match the exported symbols of the proxy target library. The matching set of exported symbols may allow applications to interact with the proxy library as they would have interacted with the proxy target library. The template proxy library (e.g., template proxy library 102) may either include the set of already known proxy target export symbols at build time or the template proxy library may reserve space (e.g., reserved space for proxy exports 106) for exported symbols that may be filled in at runtime by a kernel mode driver.

If the template proxy library reserves space (e.g., reserved space for proxy exports 106) and does not include all the proxy target library's export symbols, a kernel mode driver may add any of the missing proxy target's exported symbols into the proxy library. Regardless of how the exports are populated within the template proxy library, either at build time or at runtime by the driver, the proxy target exported symbols may be implemented at some level within the proxy library or forwarded to the proxy target library.

If the symbols are built into the template proxy library at build time, the build of the template proxy library can either include a forwarding reference to the proxy target library or point to an implementation within the template proxy library (e.g., each proxy export in proxy exports 114 may be a forwarding reference to the proxy target library or point to an entry in implementation of proxy exports 116).

An issue with attempting to include all the proxy target exports into the template proxy library at build time is that it may be difficult to keep up with changes in versions of proxy target libraries in which the set of exports may change. Some embodiments described herein may solve this issue by dynamically tailoring the template proxy library to include any missing export symbols.

Figure 2:
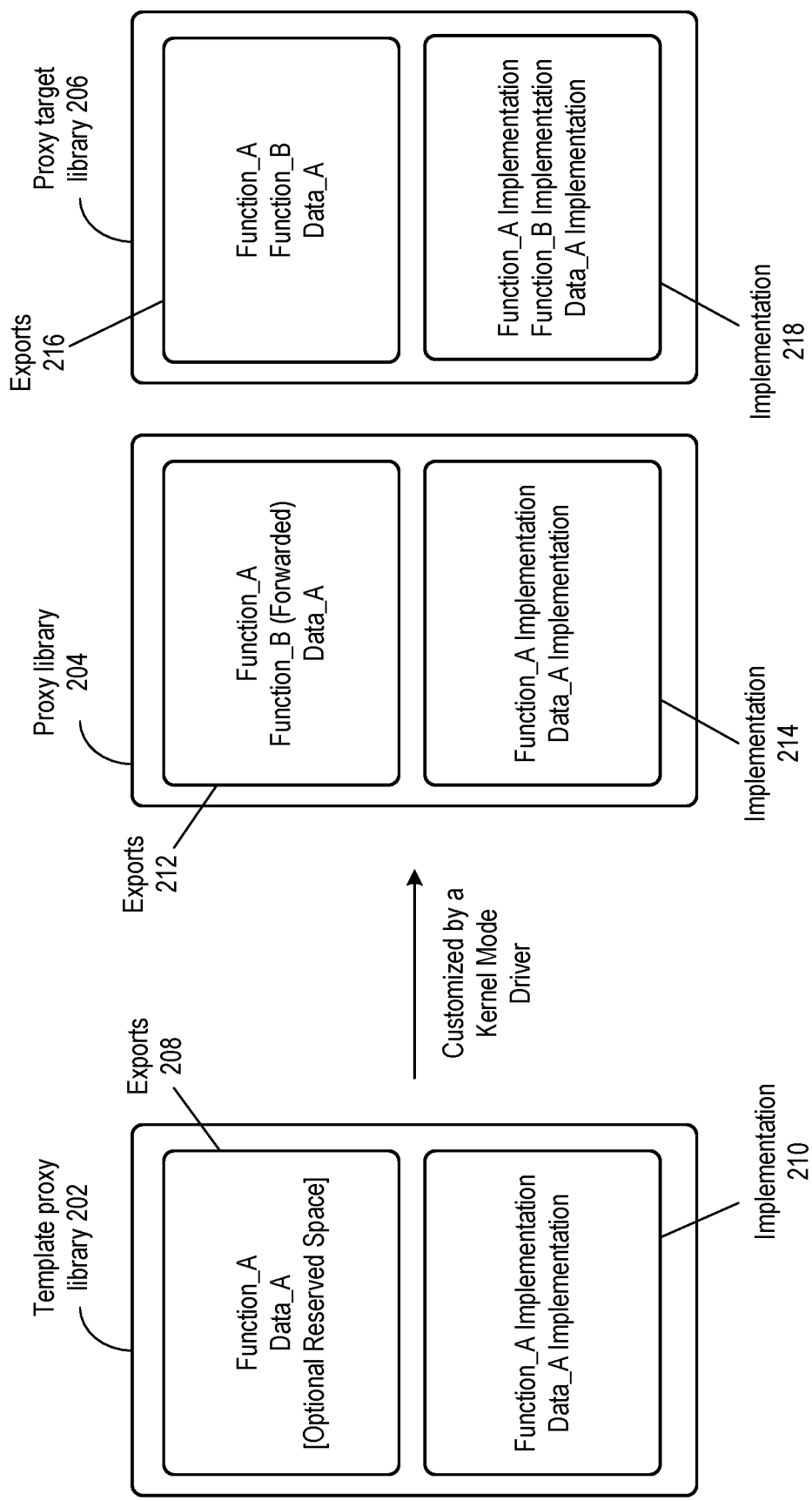
FIG. 2 illustrates a template proxy library, a proxy library, and a proxy target library in accordance with some embodiments described herein.

FIG. 2 illustrates a template proxy library, a proxy library, and a proxy target library in accordance with some embodiments described herein.

Template proxy library 202 may include exports 208 and implementation 210. Exports 208 may include the symbols "Function_A" and "Data_A," and optionally include reserved space to store other symbols during customization. In some embodiments, implementation 210 is optional, i.e., template proxy library 202 may not include any implementations. In other embodiments, implementation 210 may include an implementation for one or more symbols, e.g., "Function_A Implementation" and "Data A Implementation." Function_A Implementation may include a set of processor instructions which, when executed by a processor, may perform a desired function, and Data_A Implementation may include data. For example, in some embodiments, the data in Data_A Implementation may be used by Function_A Implementation.

Proxy target library 206 may include exports 216 and implementation 218. Exports 216 may include symbols "Function_A," "Function_B," and "Data_A." Implementation 218 may include implementations of "Function_A," "Function_B," and "Data_A."

Proxy library 204 may be obtained by customizing template proxy library 202 using a kernel mode driver. Proxy library 204 may include exports 212 and implementation 214. Exports 212 may include the symbols "Function_A" and "Data_A" which were present in exports 208 of template proxy library 202 and include symbol "Function_B" which may be added to the reserved space in exports 208 of template proxy library 202 after it is loaded into memory. The disk version of template proxy library 202 may remain unchanged; the modification may occur in memory after the template proxy library 202 is loaded into the memory. Implementation 214 may include implementations for symbols "Function A" and "Data_A" which were present in implementation 210. Symbol "Function_B" in exports 212 of proxy library 204 may be forwarded to proxy target library 206. Thus, when "Function_A" is called in proxy library 204, the "Function_A" implementation in implementation 214 of proxy library 204 may be executed, but when "Function_B" is called in proxy library 204, the "Function_B" implementation in implementation 218 of proxy target library 206 may be executed. When "Data_A" is accessed in proxy library 204, the "Data_A" implementation in implementation 214 of proxy library 204 may be accessed.

In the case of using forwarding references to the proxy target library, the name of the virtual proxy target library (e.g., virtual proxy target library path 118) may be agreed upon between the template proxy library and the kernel mode driver, so that the driver can detect when it needs to redirect the file load. The file name used in the forwarding references may be a different file name (virtual proxy target file) from that of the proxy target library so that the driver can key off of the name and instead redirect to the intended proxy target library.

In some embodiments described herein, the kernel mode driver may handle the addition of any unimplemented proxy target export symbols at runtime (e.g., adding "Function_B" to exports 212 of proxy library 204). When a kernel mode driver adds any missing proxy target export symbols, it does so, using export forwarding such that any use of those export symbols may be forwarded to the proxy target library (e.g., forwarding "Function_B" in exports 212 to point to the "Function_B" implementation in implementation 218 of proxy target library 206). Having a kernel mode driver fill in the needed export symbols at runtime ensures that all the needed export symbols are included within the proxy library. For the kernel mode driver to have access to the export table within the template proxy library at runtime, it is important to ensure that the export table section (e.g., exports 208) is marked as read/write at build time. This allows for the driver to make changes during the load of the template proxy library at runtime and an attempt to write may cause a copy-on-write for the process, thus allowing each process to have their own version of the customizations. If desired, the driver can change the exports to read only afterwards to prevent additional modifications.

In some embodiments described herein, a kernel mode driver may fill in the needed export symbol forwarding references for any target proxy library export not already included within the template proxy library. The template proxy library can provide exports with the same name or ordinal as the proxy target library's exports to indicate to the kernel mode driver, which exports are implemented within the template proxy library. Any export symbols that already exist within the template proxy library may not be modified by the kernel mode driver, even if those export symbols match export symbols within the proxy target library. For example, "Function_A" exists in exports 208, and may not be modified by the kernel mode driver when creating proxy library 204 based on template proxy library 202.

When the kernel mode driver attempts to transform the template proxy library into a complete proxy library, the driver may compare the exported symbols (e.g., exports 208) included the template proxy library with the exports (e.g., exports 216) included in the proxy target library. During the comparison process, the driver may add any exported symbols (e.g., "Function_B") found within the proxy target library that do not exist within the template proxy library. When adding the missing proxy target library exports to the proxy library, the driver may add them as forwarding references (e.g., "Function_B") since the proxy library does not implement those exports. Any implemented exports would have been included within the template proxy library's exports (e.g., "Function_A Implementation" and "Data_A Implementation" in implementation 210).

Having the driver compare exported symbols and only adding the exports that do not exist within the template proxy library, prevents the driver from overwriting any exported symbols already included by the build of the template proxy library. At the same time, it ensures that any exported symbols included in the proxy target library are also included as forwarding references within the proxy library. This process allows for embodiments to work, even if, the proxy target was to add additional exported symbols in the future. Lastly, it is important to note that embodiments allow for various amounts of customization of the template proxy library, by the kernel mode driver, based on the user's desired level of dynamic customization.

Proxy Target Import

In the case where the proxy library hooks or provides some additional implementation of the proxy target's exports, the proxy library may call the proxy target. Making calls to the proxy target from the proxy, can be done by either including imports of the proxy target's exports at build time or procedure addresses can be retrieved at runtime. In the case of importing exports of the proxy target library, the usual import process includes the name of the library and the symbols to import. The symbols to be imported may be included at build time, since the template proxy library is including the implementation, it may also know the imports it will use in that implementation.

The template proxy library may include the virtualized redirect proxy target name instead of the real proxy target library name or path. The use of the virtualized file name, and or path, may be used to indicate to the kernel mode driver that the file path may be updated to the original path used by the application. This was the path that was redirected to the template proxy library and is the path where the real proxy target library resides. When the driver notices the use of the virtualized file name and/or path, it may modify the import path to include the virtualized file name and the path originally used for the proxy target library that was previously redirected to the target proxy library. In other words, in some embodiments described herein, the file name is not modified to the proxy target library and the path is modified to use what was used for the proxy target library.

The template proxy library may include the virtualized proxy target name within a read/write section so that the kernel mode driver may have the access needed to customize the path to the proxy target library. The path is useful because in some cases the same file name can occur in numerous places within a computer's storage. Having the kernel mode driver specify the path prevents from an incorrect copy of the proxy target from being loaded or prevents from a file that happens to share the same name from being loaded (e.g., two unrelated companies may have a library named "a.dll"). The template proxy library's read/write section may also be copy-on-write which may ensure that each process has its own copy of the import path and so each process can reference a different proxy target library if required.

Another reason for importing the proxy target library is that if the template proxy library does not forward any of the exports to the proxy target library, then the proxy target library may not be loaded. In this case, the import of at least one export of the proxy target library may cause the proxy target library to be loaded, if it is desired to have the proxy target library loaded.

Kernel Mode File System Filter Driver

The kernel mode driver may detect the loading of proxy target libraries, redirect the load of a proxy target library to a template proxy library, and customize the template proxy library so that the template proxy library can be used as a proxy for the proxy target library. For the kernel mode driver to perform these tasks, the driver may register to receive relevant notifications from the operating system.

The driver may function as a file system filter driver so that it is able to perform file redirection of proxy target libraries to template proxy libraries during the attempted load of proxy target libraries. The kernel mode driver may be installed in a location in the software stack that allows for the kernel mode driver to begin processing handle creations before (i.e., pre-notification) and after (i.e., post-notification) other file system filter drivers in the software stack.

The kernel mode driver may subscribe to the create and terminate process notification mechanism provided by the OS (e.g., the Windows® OS). The driver may make use of the process creation notification for the creation of data structures needed for state during other callbacks. When the same callback is received with the process terminated flag, the driver may perform any necessary cleanup of data structures used for state. The driver may register for the load image notification provided by the OS (e.g., the Windows® OS). This notification may be used by the driver to perform the customization of a template proxy library during its load, so that customized templated proxy library can be used as a proxy library for a proxy target library. The driver may handle these notifications concurrently from multiple processes, file handle creations, and image loads.

Process Creation and Termination

During initialization, the kernel mode driver may use the PsSetCreateProcessNotifyRoutine or one of its extended variants, such that it is notified when processes are created and terminated by the operating system. Once the driver has registered for this notification, the driver may receive callbacks from the OS (e.g., the Windows® OS) whenever a process is created or terminated until the driver unregisters for these notifications. The kernel mode driver may use this notification to track process creation and termination. During the creation of a process, the kernel mode driver may choose to create data structures to track proxying related information. During the callback used for process termination, the driver can free any previously allocated data structures used to store proxying or any other related state as needed.

File System Create Handle

The kernel mode driver may redirect file handle creation of proxy target libraries such that the template proxy library is used as the target of the file handle instead of the intended proxy target library during attempts to load a proxy target library into a process. This process causes the loader in the OS (e.g., the loader in the Windows® OS) to load the template proxy library instead of the proxy target library since the process of loading of a library requires obtaining a file handle to the library file to be loaded. The loader believes that it is using a handle to the proxy target library, although it is actually using a handle to the template proxy library.

In a Windows® OS implementation, an IRP_MJ_CREATE request may be used to open a handle to a file object or a device object. The kernel mode driver can be written as a file system filter driver so that it can register for and receive notifications of IRP_MJ_CREATE requests. It is during these notifications that the kernel mode driver can perform redirection if it finds that the target of the IRP_MJ_CREATE is a proxy target library and if it is attempting to be loaded into the process as a library rather than just for I/O operations such as reading or writing.

Figure 3:
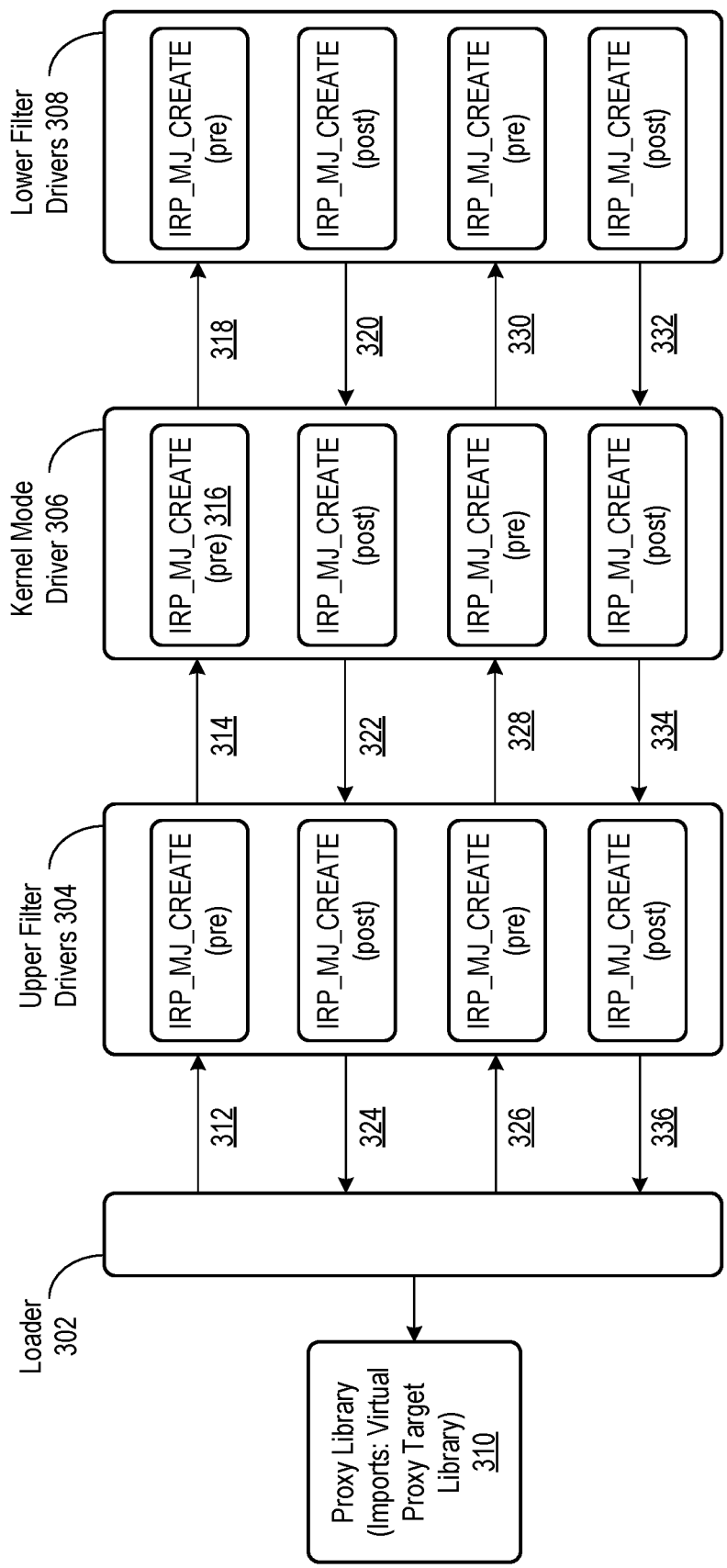
FIG. 3 illustrates a kernel mode driver in accordance with some embodiments described herein.

FIG. 3 illustrates a kernel mode driver in accordance with some embodiments described herein.

Requests created by loader 302 may be processed by upper filter drivers 304, kernel mode driver 306, and lower filter drivers 308. Loader 302 may create an IRP_MJ_CREATE request (at 312) to open a handle for the proxy target library, which may be processed by upper filter drivers 304, and provided to kernel mode driver 306 (at 314). In some embodiments described herein, kernel mode driver 306 may include code that is executed when a file handle is being created and when an image is mapped into memory.

When an IRP_MJ_CREATE notification is received, the kernel mode driver 306 may first check if the target of the operation is for a proxy target library. The driver can do this by first using functions such as FltGetFileNameInformation and FltParseFileNameInformation to retrieve the file name information of the target file. Next, with that information in hand, kernel mode driver 306 can check if the target file name, and or path, matches a proxy target file. If the file name information of the target matches a proxy target file and the proxy target file exists, kernel mode driver 306 then checks if the operation is being performed by the loader 302.

The driver can use the detection of the loader 302 on the user mode stack to ensure that the file is being used for loading into the process. In some operating systems, it may be possible to check flags to determine if the loader is the client of the file handle creation. Unless otherwise stated, it may be assumed that the stack needs to be inspected to determine if the file handle creation is initiated by the loader. In a Windows® OS implementation, the kernel mode driver 306 can check the user mode stack for the loader 302 in the following manner. First, the kernel mode driver 306 can obtain the Thread Environment Block (TEB) to get the user mode stack of the current thread. Next, the kernel mode driver 306 can use PsGetCurrentThread to obtain the ETHREAD structure. The ETHREAD structure contains a member of type KTHREAD and the KTHREAD structure has a KTRAP_FRAME pointer that contains an RSP member which is the stack pointer. The TEB can also be used to obtain the NT_TIB which has two members StackBase and StackLimit. Together these values can be used to search for the loader 302 within the current user mode thread stack.

It may be assumed that kernel mode driver 306 knows which loader function or functions to search for within the stack. If these addresses are not known in advance, the kernel mode driver 306 can also obtain them during an image load callback explained in more detail below. During the image (module) load callback, the kernel mode driver 306 can check if the image load notification is due to the load of the loader library NTDLL.DLL and if so, the kernel mode driver 306 can then obtain the address of the functions needed to check the stack. One such exported function may be the loader function, LdrLoadDll. Once that address is obtained the function can either be disassembled at runtime to find the end address of the routine. Some embodiments may use the start address of the next, based on start address, exported function as the end address. Once a code range is established for the load library function, based on a start address and an end address, the stack may be searched for an address within that established range. If walking the stack shows the use of an address within the established range, then the embodiment can determine that the loader 302 initiated the call to the OS to create a file handle (IRP_MJ_CREATE) for the purposes of loading a library and in this case, for a proxy target library.

If the kernel mode driver 306 determines that all the aforementioned preconditions are met, then the driver can optionally cache the proxy target library export information and perform the redirection of the proxy target library to the template proxy library. The kernel mode driver 306 may store the proxy target library export information so that the information can later be used to customize the template proxy library into a proxy library. Gathering the proxy target library export information at load time is optional but it may be easier than retrieving it later during the process of customizing the template proxy library. After optionally caching export information, the kernel mode driver 306 may make the necessary changes to redirect the proxy target library file handle creation to the template proxy library file.

In a Windows® OS implementation, the kernel mode driver 306 can use a function such as IoReplaceFileObjectName to replace the target file object name information with the name and or path of the template proxy library. The kernel mode driver 306 may call FltSetCallbackDataDirty to flag that modifications have been made, allocate a data structure to store the name and path of the proxy template library, and set the newly allocated object as the completion object. The kernel mode driver 306 may do this so that the post IRP_MJ_CREATE handler can optionally once again replace the file name to the proxy library.

The kernel mode driver 306 may return FLT_PREOP_SUCCESS_WITH_CALLBACK to ensure that the post handler is called after lower drivers in the stack have performed their operations. The use of the post IRP_MJ_CREATE is optional and its use may depend on the use of FLT_PREOP_SUCCESS_WITH_CALLBACK within the pre-operation handler.

Kernel mode driver 306 may then provide the IRP_MJ_CREATE request with the template proxy library file name and/or path to the lower filter drivers 308 (at 318). The request may be passed (at 320) to kernel mode driver 306 and then then passed (at 322) to upper filter drivers 304. Upper filter drivers 304, kernel mode driver 306, and lower filter drivers 308 may fill in values of a data structure. A file handle may be created based on the data structure and the file handle may be provided to the entity that originated the request (e.g., loader 302). In some embodiments described herein, the file handle may be created by the OS based on the information that was filled into the data structure by upper filter drivers 304, kernel mode driver 306, and lower filter drivers 308. At this point, loader 302 has a file handle to the proxy library 310.

In some embodiments, the proxy library may include an import for a virtual proxy target library. A similar process may be used for obtaining a handle for the virtual proxy target library. Specifically, loader 302 may create an IRP_MJ_CREATE request (at 326) to open a handle for the virtual proxy target library, which may be processed by upper filter drivers 304, and provided to kernel mode driver 306 (at 328).

Kernel mode driver 306 may be able to distinguish whether the IRP_MJ_CREATE request is for a proxy target library or a virtual proxy target library. If the creation of a file handle is for the virtual proxy target file, the kernel mode driver 306 may also perform redirection. In this case, the kernel mode driver 306 may redirect using the file rename process described above by renaming the virtual template proxy file name information to the real (original) proxy target file name. Thus, kernel mode driver 306 may provide an IRP_MJ_CREATE request (at 330) for the proxy target library (instead of the virtual proxy target library) to lower filter drivers 308. The use of a virtual proxy target file name and path allows for the loader 302 to treat the virtual proxy target file as a different file, i.e., a file other than the proxy target file. This may be important because the loader 302 may believe that it loaded the proxy target file earlier, which was really the template proxy file caused by the earlier redirection performed by an embodiment's driver.

Lower filter drivers 308, kernel mode driver 306, and upper filter drivers 304 may fill information in a data structure as the request is passed between the drivers, e.g., at 332, 334, and 336. A file handle may be created (e.g., by the OS) for the proxy target library (instead of the virtual proxy target library) based on the information in the data structure, and the file handle may be provided to loader 302. At this point, loader 302 has a file handle to the proxy target library.

When the template proxy file is loaded by the loader 302, the loader 302 may find an optional import of a virtual proxy target file. One reason the template proxy file might contain an import to a virtual proxy target file is because the template proxy library may not forward any exports to the proxy target library. If the template proxy library wishes to have the proxy target library loaded for other reasons, as mentioned earlier in this document, it can include an import reference to a virtual proxy target file that the kernel mode driver 306 may know to redirect to the real proxy target library. The kernel mode driver 306 can be made aware of the redirection mapping in numerous ways, but some possible options are either well-known mappings built into the kernel mode driver 306 or configuration settings.

After the kernel mode driver 306 redirects the virtual proxy target file to the real proxy target library file, the loader 302 may load the proxy target file under the guise of the virtual proxy target file. The result of the loader 302 believing that the virtual proxy target file is a file other than the real proxy target file is that the loader 302 may load both the proxy target library and the proxy library but may refer to each by the name of its counterpart.

The loader 302 may not load the proxy target library again if it believes that it has already loaded the proxy target library initially when it was redirected to the template proxy library. Specifically, in a Windows® OS implementation, the loader 302 may believe that the original proxy target library load was in fact the proxy target library, although it was redirected to the template proxy library. For example, the loader 302 may maintain a list of files loaded and since it asked the file system for a handle to the proxy target library, it assumes that the handle it received from the operating system is associated with the proxy target library and is unaware that the handle is for the template proxy library. Since the loader 302 already contains the proxy target library name in its list, it may assume that the file loaded was the proxy target. This is the reason for using a virtual proxy target library name that the driver can then redirect to the real proxy target library. This allows for the loader 302 to believe that it received a handle for the virtual proxy target library file when, in actuality, it received a handle to the proxy target library.

File System Post Create

In a Windows® OS implementation, the kernel mode driver 306 may use an IRP_MJ_CREATE post processing callback to once again rename the file so that the client and upper filter drivers may see the original file name asked for by the loader. Recall that during the preprocessing, the kernel mode driver 306 renamed the file name to the redirected file name. The post processing callback is the driver's chance to return the file name to what was asked for by the loader so that the client and loader are unaware of the redirection. In other words, the request at 314 may include the proxy target library filename, the request at 318 may include the template proxy library filename, the handle at 320 may include the template proxy library filename, and the handle at 322 may include the proxy target library filename. Once again, IoReplaceFileObjectName or a similar function can be used to rename the target file object to the redirected file name. A function such as FltSetCallbackDataDirty is used to indicate that the data has been modified.

Image Loaded Notification

In some embodiments described herein, the kernel mode driver 306 may register for image load notifications from the Windows® OS. These notifications may be used for two purposes: first, the kernel mode driver 306 can use this notification to obtain the base address of the NTDLL.DLL library that contains the optional loader routines, and second to perform the customization of the template proxy library into a proxy library.

The use of the image load callback to get the base address of NTDLL.DLL is optional. The base address can be used to determine if the loader was attempting to load a library when an IRP_MJ_CREATE operation is being performed for a proxy target library. Obtaining the base address of NTDLL.DLL when it is loaded can save processing during the IRP_MJ_CREATE operation. Other embodiments may use other ways to check the stack for the loader as mentioned elsewhere in this document.

The image load callback may also allow for the kernel mode driver 306 to customize or tailor the template proxy library to what is required to proxy the proxy target library. When the load of the template proxy library is the cause for the image load callback, the kernel mode driver 306 can make the needed customizations to the template proxy library, thus resulting in a tailored proxy library.

Tailoring or customization of the template proxy library may include multiple possible modifications, of which some may be optional. One modification may involve the customization of the template proxy library's exports so that all of the proxy target's exports are included. The kernel mode driver 306 first needs to know what exports exist within the proxy target library. The kernel mode driver 306 can gather the proxy target library's export information during the initial IRP_MJ_CREATE pre-operation callback for the proxy target library. During this callback, the kernel mode driver 306 can use the lower filter drivers 308, via calls to routines such as FltReadFile, to get the proxy target file's data, store the export information, and then cause the file redirection to occur. When the image load notification occurs for the load of the template proxy library, the kernel mode driver 306 can retrieve the previously cached export information of the proxy target library and ensure those exports exist in the proxy library's exports. The kernel mode driver 306 may not copy the exports into the template proxy library as they exist in the proxy target library, instead the kernel mode driver 306 may make sure that the set of exports in the proxy target library exist within the proxy library. The proxy library can have additional exports if needed, but in some embodiments, at a minimum, the proxy library may contain the set of symbols exported from the proxy target library.

The kernel mode driver 306 may compare the set of exports that already exist in the template proxy library with the set of exported symbols in the proxy target library. If the same symbol is exported in both libraries, the kernel mode driver 306 may just leave the exported symbol, as is, in the template proxy library because it means that the template proxy library has provided an implementation. Any exported symbol that exists within the proxy target library but does not exist within the template proxy library, may be added to the proxy library as a forwarding reference to the proxy target library using the virtual proxy target file name.

This process ensures that any symbols that the template proxy library wanted to implement locally may be honored and any of the proxy target exported symbols missing from the template proxy library may be included within the tailored proxy library, but they may be included as forwarding references to the same export symbol within the proxy target library using the virtual proxy library name. The virtual proxy target name may be used to ensure the correct target due to redirection.

An optional modification may be based on the data contained within the template proxy library. In some cases, the template proxy library and ultimately the tailored proxy library may want to import the proxy target library. In such cases, the template proxy library may include an import reference by using the virtual proxy target library name and reserve additional space for the kernel mode driver 306 to include the full path to the proxy target library. If the kernel mode driver 306 detects an import reference to a virtual proxy target library, it may first retrieve the size of the reserved space included by the template proxy library, and then modify the virtual proxy target name with the path to the virtual proxy target library. The new path, not the file name, may equal the path of the original proxy target library path seen by the kernel mode driver 306 during the IRM_MJ_CREATE pre-operation callback before the changes were made for redirection. During that time, the kernel mode driver 306 may ensure that the proxy target file exists before redirecting since it would not want to perform a redirection for a file that does not exist. If the proxy target library file does exist, the kernel mode driver 306 may store the path to the proxy target library. Later, when creating the import file path to the virtual proxy target library, the kernel mode driver 306 may use the earlier obtained path to the real proxy target library and use the virtual proxy target library name. Later, the loader may parse the proxy library's imports and attempt to load those imports if they are not already loaded. Once again, the kernel mode driver 306 may receive an IRP_MJ_CREATE pre-operation callback and at this time it may redirect using the path used by the loader, which was earlier populated by the kernel mode driver 306, and replace the virtual proxy target library name with the proxy target file name. The new path may be used by the remaining file system drivers and the handle returned to the loader may be a handle to the proxy target library, although the loader may think that this handle refers to a library with the virtual proxy target name.

At this point, whenever the application or another module makes a call to a routine that it believes is within the proxy target library, the call to the routine may instead call the proxy library. The proxy library can either completely or partially implement the export as well as to forward the use to the proxy target library. When partially implementing the export, the proxy library can perform some level of functionality and then supplement that with a call to the proxy target library's routine or even call another library's routine, or any combination of those.

Figure 4A:
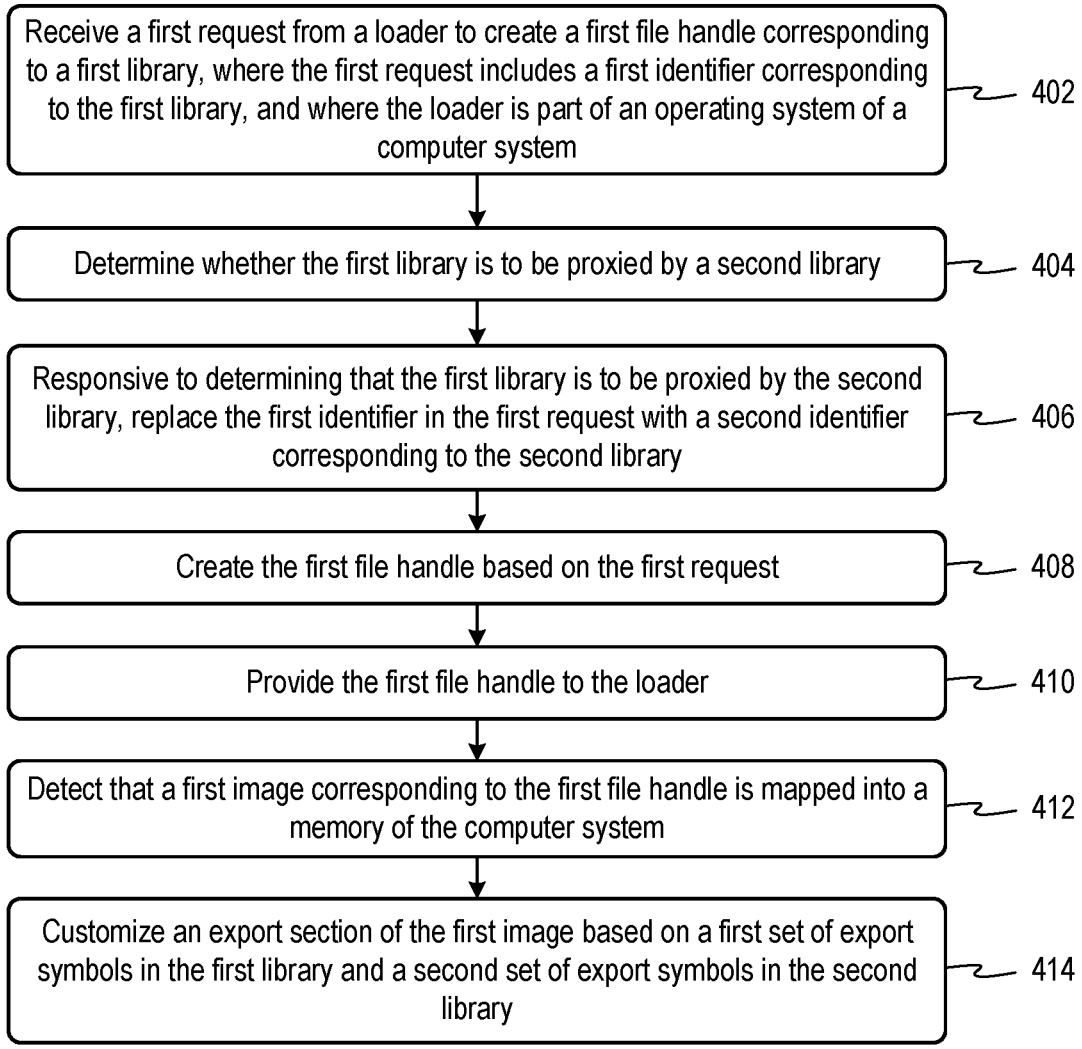
FIGS. 4A-4B illustrate a process for zero modification export hooking in accordance with some embodiments described herein.
Figure 4B:
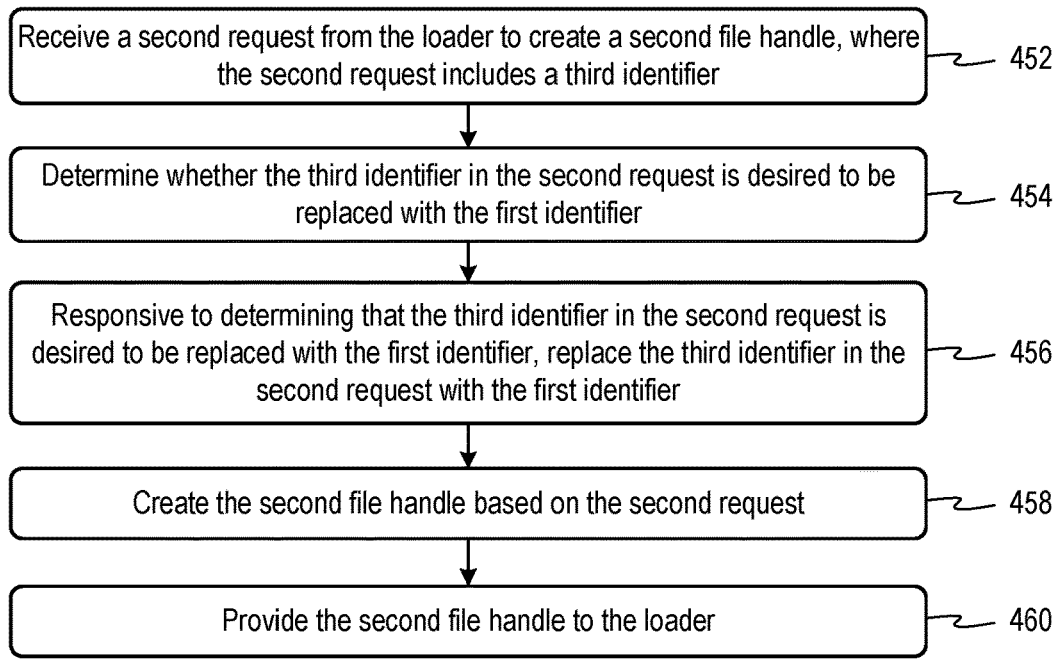

FIGS. 4A-4B illustrate a process for zero modification export hooking in accordance with some embodiments described herein.

Referring to FIG. 4A, a first request may be received from a loader to create a first file handle corresponding to a first library, where the first request may include a first identifier corresponding to the first library, and where the loader may be part of an operating system of a computer system (at 402). For example, the first library may be the proxy target library, and loader 302 may create an IRP_MJ_CREATE request to open a handle for the proxy target library. It may be determined whether the first library is to be proxied by a second library (at 404). Specifically, determining that the first library is to be proxied by the second library may include determining if the first identifier is in a set of identifiers corresponding to libraries that are desired to be proxied. For example, the second library may be the template proxy library, and kernel mode driver 306 may determine that the proxy target library (i.e., first library) is to be proxied by the template proxy library (i.e., second library).

Responsive to determining that the first library is to be proxied by the second library, the first identifier in the first request may be replaced with a second identifier corresponding to the second library (at 406). The first identifier may be a first file system path corresponding to the first library and the second identifier may be a second file system path corresponding to the second library. A file handle may be created based on the first request (at 408). For example, the operating system may create the first file handle based on the first request. The first file handle may be provided to the loader (at 410). Specifically, providing the first file handle to the loader may include creating a first response corresponding to the first request, where the first response includes the first file handle and the first identifier, and providing the first response to the loader.

The operating system may map a first image corresponding to the first file handle into a memory of the computer system. For example, the operating system may allocate space in the memory of the computer system and copy the contents of the file corresponding to the first file handle into the allocated space. Referring to FIG. 4A, it may be detected that the first image corresponding to the first file handle is mapped into the memory of the computer system (at 412). Specifically, kernel mode driver 306 may register for image load notifications from the operating system. An export section of the first image may be customized based on a first set of export symbols in the first library and a second set of export symbols in the second library (at 414). For example, exports 208 section in template proxy library 202 may be customized. Specifically, customizing the export section of the first image may include determining an export symbol that is in the first set of export symbols but is not in the second set of export symbols, and adding a forwarding reference into the export section of the first image, where the forwarding reference corresponds to the export symbol in the second library. For example, a forwarding reference to "Function_B" may be added as shown in exports 212 section of proxy library 204.

The first set of export symbols may be cached while determining that the first library is to be proxied by the second library (i.e., at 404) and the cached export symbols may then be used during customization (i.e., at 414).

In some embodiments described herein, the first library may be desired to be loaded in addition to the second library. For example, the process illustrated in FIG. 3 at 326, 328, 330, 332, 334, and 336 may be used to load the proxy target library in addition to the customized template proxy library. Referring to FIG. 4B, a second request may be received from the loader to create a second file handle, where the second request includes a third identifier (at 452). It may be determined whether the third identifier in the second request is desired to be replaced with the first identifier (at 454). Specifically, determining that the third library is to be proxied by the first library may include determining if the third identifier is in a set of identifiers corresponding to libraries that are desired to be proxied. The third identifier in the second request may be replaced with the first identifier (at 456). The second file handle may be created based on the second request (at 458) and provided to the loader (at 460). Specifically, providing the second file handle to the loader may include creating a second response corresponding to the second request, where the second response includes the second file handle and the third identifier, and providing the second response to the loader. The third identifier may be a third file system path corresponding to the third library. In some embodiments described herein, the third file system path may be an invalid path.

Figure 5:
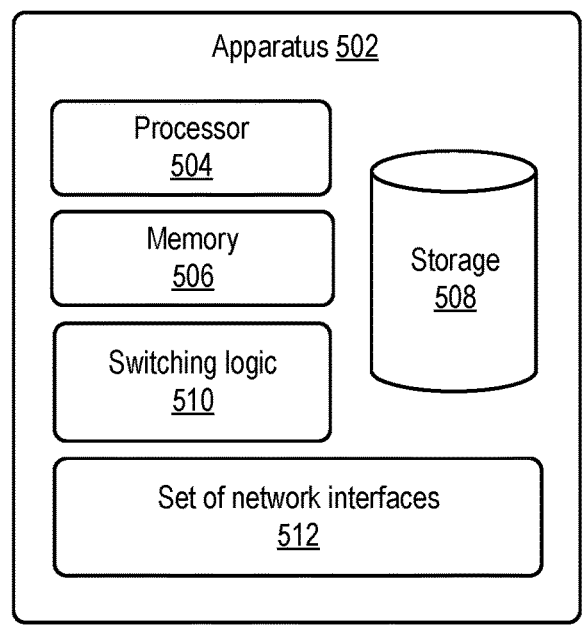
FIG. 5 illustrates an apparatus in accordance with some embodiments described herein.

FIG. 5 illustrates an apparatus in accordance with some embodiments described herein.

Apparatus 502 (e.g., a device, a file server, etc.) can include processor 504, memory 506 (e.g., a volatile or non-volatile random access memory), and storage 508 (e.g., a flash memory device or a disk drive). Storage 508 can store data and executable code. The components in apparatus 502 can communicate with one another using a communication mechanism (not shown in FIG. 5), e.g., a bus, a backplane, and/or a switching fabric. Executable code stored in storage 508 can include instructions that, when executed by processor 504, cause apparatus 502 to perform one or more methods that are implicitly or explicitly described in this disclosure. Storage 508 can also store any data that is required by any processes that are performed by apparatus 502.

Apparatus 502 can also include switching logic 510 and set of network interfaces 512. Set of network interfaces 512 can be used to transmit data to and/or receive data from other communication devices. Switching logic 510 can forward network traffic received on one or more network interfaces in accordance with switching/forwarding/routing information stored in apparatus 502. Specifically, switching logic 510 can be configured by processor 504 in accordance with one or more methods that are implicitly or explicitly described in this disclosure.

The data structures and code described in this disclosure can be partially or fully stored on a non-transitory computer-readable storage medium, a hardware module, and/or hardware apparatus. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules and/or hardware apparatuses. Note that the methods and processes can be embodied using a combination of code, data, hardware modules, and/or hardware apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   receiving a first request from a loader to create a first file handle corresponding to a first library, wherein the first request includes a first identifier corresponding to the first library, and wherein the loader is part of an operating system of a computer system;
   determining whether the first library is to be proxied by a second library;
   responsive to determining that the first library is to be proxied by the second library, replacing the first identifier in the first request with a second identifier corresponding to the second library;
   creating the first file handle based on the first request; and
   providing the first file handle to the loader, wherein the providing the first file handle to the loader comprises replacing the second identifier with the first identifier in a first response corresponding to the first request.

2. The method of claim 1, further comprising:
   detecting that a first image corresponding to the first file handle is mapped into a memory of the computer system; and
   customizing an export section of the first image based on a first set of export symbols in the first library and a second set of export symbols in the second library.

3. The method of claim 2, wherein the customizing the export section of the first image comprises:
   determining an export symbol that is in the first set of export symbols but is not in the second set of export symbols; and
   adding a forwarding reference into the export section of the first image, wherein the forwarding reference corresponds to the export symbol in the second library.

4. The method of claim 3, wherein the determining whether the first library is to be proxied by the second library comprises caching the first set of export symbols in the first library.

5. The method of claim 1, wherein the determining whether the first library is to be proxied by the second library comprises determining if the first identifier is in a set of identifiers corresponding to libraries that are desired to be proxied.

6. The method of claim 1, further comprising:
   receiving a second request from the loader to create a second file handle, wherein the second request includes a third identifier;
   determining whether the third identifier in the second request is desired to be replaced with the first identifier;

responsive to determining that the third identifier in the second request is desired to be replaced with the first identifier, replacing the third identifier in the second request with the first identifier;

creating the second file handle based on the second request; and providing the second file handle to the loader, wherein the providing the first file handle to the loader comprises replacing the second identifier with the first identifier in a first response corresponding to the first request.

7. The method of claim 6, wherein the first identifier is a first file system path corresponding to the first library, wherein the second identifier is a second file system path corresponding to the second library, and wherein the third identifier is a third file system path.

8. The method of claim 7, wherein the third file system path is an invalid path.

9. The method of claim 6, wherein the determining whether the third identifier in the second request is desired to be replaced with the first identifier comprises determining if the third identifier is in a set of identifiers that are desired to be replaced.

10. The method of claim 6, wherein a second response corresponding to the second request includes the second file handle and the third identifier.

11. A non-transitory computer-readable storage medium storing instructions which, when executed by a processor, cause the processor to:

receive a first request from a loader to create a first file handle corresponding to a first library, wherein the first request includes a first identifier corresponding to the first library;

determine that the first library is to be proxied by a second library in response to determining that the first identifier is in a set of identifiers corresponding to libraries that are desired to be proxied;

replace the first identifier in the first request with a second identifier corresponding to the second library;

create the first file handle based on the first request; and provide the first file handle to the loader, wherein the providing the first file handle to the loader comprises replacing the second identifier with the first identifier in a first response corresponding to the first request.

12. The non-transitory computer-readable storage medium of claim 11 further storing instructions which, when executed by the processor, cause the processor to:

detect that a first image corresponding to the first file handle is mapped into a memory coupled to the processor;

determine an export symbol that is in a first set of export symbols in the first library but is not in a second set of export symbols in the second library; and add a forwarding reference into the export section of the first image, wherein the forwarding reference corresponds to the export symbol in the second library.

13. The non-transitory computer-readable storage medium of claim 11 further storing instructions which, when executed by the processor, cause the processor to:

receive a second request from the loader to create a second file handle, wherein the second request includes a third identifier;

determine whether the third identifier in the second request is desired to be replaced with the first identifier;

responsive to determining that the third identifier in the second request is desired to be replaced with the first identifier, replace the third identifier in the second request with the first identifier;

create the second file handle based on the second request; and provide the second file handle to the loader.

14. The non-transitory computer-readable storage medium of claim 13, wherein the first identifier is a first file system path corresponding to the first library, wherein the second identifier is a second file system path corresponding to the second library, and wherein the third identifier is a third file system path.

15. The non-transitory computer-readable storage medium of claim 14, wherein the third file system path is an invalid path.

16. The non-transitory computer-readable storage medium of claim 13, wherein a second response corresponding to the second request includes the second file handle and the third identifier.

17. An apparatus, comprising:

a memory storing instructions; and a processor, coupled to the memory and to execute the instructions, the instructions when executed cause the processor to:

receive a first request from a loader to create a first file handle corresponding to a first library, wherein the first request includes a first 6 identifier corresponding to the first library;

determine whether the first library is to be proxied by a second library;

responsive to determining that the first library is to be proxied by the second library, replace the first identifier in the first request with a second identifier corresponding to the second library;

create the first file handle based on the first request; and provide the first file handle to the loader, wherein the providing the first file handle to the loader comprises replacing the second identifier with the first identifier in a first response corresponding to the first request.

18. The apparatus of claim 17, wherein the instructions when executed cause the processor to:

detect that a first image corresponding to the first file handle is mapped into the memory; and customize an export section of the first image based on a first set of export symbols in the first library and a second set of export symbols in the second library.

\* \* \* \* \*

UNITED STATES PATENT AND TRADEMARK OFFICE
CERTIFICATE OF CORRECTION

| | | |
|---|---|---|
| PATENT NO. | : 12,340,188 B1 | Page 1 of 1 |
| APPLICATION NO. | : 18/059342 | |
| DATED | : June 24, 2025 | |
| INVENTOR(S) | : John J. Delio, Jr. | |

It is certified that error appears in the above-identified patent and that said Letters Patent is hereby corrected as shown below:

In the Claims

In Claim 17 (Column 18, Line 36), please delete the number "6" between "first" and "identifier"

Signed and Sealed this
Thirtieth Day of September, 2025

John A. Squires
*Director of the United States Patent and Trademark Office*